United States Patent
Moffitt et al.

[11] Patent Number: 5,919,324
[45] Date of Patent: Jul. 6, 1999

[54] METHOD OF SECURING DECORATIVE INSERT TO UNDERLYING PLASTIC SKIN FOR TRIM PANEL

[75] Inventors: Roderick Wilson Moffitt, Defiance; Gary Kohls, Wauseon; Vaughn Vanderpool, Bryan, all of Ohio; Robert L. McHugh, Farmington, Mich.

[73] Assignee: UT Automotive Dearborn Inc., Dearborn, Mich.

[21] Appl. No.: 08/785,641

[22] Filed: Jan. 17, 1997

[51] Int. Cl.⁶ .................................................. B29C 45/14
[52] U.S. Cl. ............................. 156/79; 156/78; 156/212; 156/214; 156/285; 156/245; 264/46.4; 264/46.8
[58] Field of Search .................................... 156/212, 214, 156/228, 78, 79, 285, 297, 321, 245; 264/46.4, 46.8

[56] References Cited

U.S. PATENT DOCUMENTS

| | | | |
|---|---|---|---|
| 3,577,593 | 5/1971 | Jackson | 425/388 |
| 4,923,539 | 5/1990 | Spengler et al. | 156/214 |
| 5,091,031 | 2/1992 | Strapazzini . | |
| 5,340,425 | 8/1994 | Strapazzini | 264/46.8 |
| 5,397,409 | 3/1995 | Kornylo | 156/214 |
| 5,411,688 | 5/1995 | Morrison et al. . | |

FOREIGN PATENT DOCUMENTS 4343240  6/1995  Germany .

OTHER PUBLICATIONS

Patent Abstracts of Japan; Publication No.: 08072079; Publication Date: Mar. 19, 1996; Title: Production of Laminate Equipped with Decoration Element.

Patent Abstracts of Japan; Publication No.: 62019419; Publication Date: Jan. 28, 1987; Title: Manufacture of Composite Molded Body.

*Primary Examiner*—Jeff H. Aftergut
*Attorney, Agent, or Firm*—Howard & Howard

[57] ABSTRACT

An improved method of forming a vehicle trim part includes the initial step of securing an insert to a vinyl skin in a vacuum mold. The cloth insert is attached to the outer face of the skin, and the two are then placed into a foam mold as a single preform. In this way, if the cloth is improperly connected to the skin, the part can be identified as scrap before foam is injected to complete the part. Once the preform is moved into the foam mold, foam is injected behind the part. Since the preform is positioned within the mold as a single part, the invention more accurately positions the insert and skin relative to the mold prior to foam injection. Again, this improves the quality and appearance of the vinyl part.

11 Claims, 1 Drawing Sheet

METHOD OF SECURING DECORATIVE INSERT TO UNDERLYING PLASTIC SKIN FOR TRIM PANEL

BACKGROUND OF THE INVENTION

This invention relates to a simplified and improved method for securing a decorative insert to an underlying plastic skin for a trim panel.

In the prior art, vehicle trim panels such as door panels are often formed to have decorative inserts such as a cloth insert secured to a plastic skin. A foam backing is formed behind the plastic skin. The prior art has manufactured these components in a number of different methods.

With one commonly used method, the cloth insert is first secured to a rear (or non-exposed) face of the skin. The decorative face of the cloth actually initially faces the back of the skin. The cloth and skin are welded together as by dielectric welding at the perimeter of the insert. The skin is then removed within the weld, exposing the cloth. The combined cloth and skin are then placed in a foam mold, and the foam is injected into the mold rearwardly of the skin and cloth. While this prior art method has gained wide success, it would be desirable to utilize a bond type other than the dielectric weld.

One other method utilizes separate placement of the decorative cloth insert and the skin into the foam mold, prior to foam being injected into the mold. Thus, the insert is first placed in the mold, the skin is then placed over the insert, and the foam is then injected into the mold. While this method does typically result in a secure bond between the insert and the skin, placement of the insert may sometimes be inaccurate. Moreover, there is a certain percentage of scrap wherein the insert is not properly secured or positioned on the skin. With this prior method, scrap cannot be identified until after the foam has been injected and the final part has been completed. It would be desirable to identify an improper connection of the cloth to the skin earlier in the process, and before injecting the foam.

SUMMARY OF THE INVENTION

In a disclosed embodiment of this invention, a separate mold is utilized to initially secure the insert to the outer face of the skin. The insert is secured to what will become the outer face of the skin by some means in a vacuum form mold. An adhesive may be utilized, or the insert could be simply secured to the skin, since the skin is preferably at a relatively high temperature when placed in the mold along with the cloth. In one embodiment, the vacuum form mold is provided with a cavity, and a plug moves with the insert forcing the insert and skin into the cavity.

Once the insert has been secured to the skin, the combined skin and insert are removed from this first mold. The combined skin and insert are then placed as a preform into the foam mold. Preferably, a tuck blade is formed on the foam mold which surrounds the entire periphery of the insert. The insert is located within the tuck blade. The tuck blade forms a tuck seam around the edges of the insert, and forces the insert back into the skin.

Since the skin and insert are placed into the mold as a single preform, one can check the propriety of the preform prior to injecting the foam behind the skin. Thus, there will be no unnecessary scrap after molding. In addition, the improved method ensures the proper placement of the insert and skin within the mold. The invention is also in that the bond between the insert and the skin is not exposed to the foam.

Once the preform is placed in the mold, foam is injected behind the skin to complete the trim panel. The combined trim panel is then removed from the mold.

With the instance invention, not only is the manufacture of a trim panel greatly simplified over the prior art methods, but the method provides reduced scrap, and more accurate formation of the trim panel. This is an improvement over the prior art methods.

These and other features of the present invention can be best understood from the following specification and drawings, of which the following is a brief description.

DETAILED DESCRIPTION OF THE PREFERRED EMBODIMENT

Figure 1:
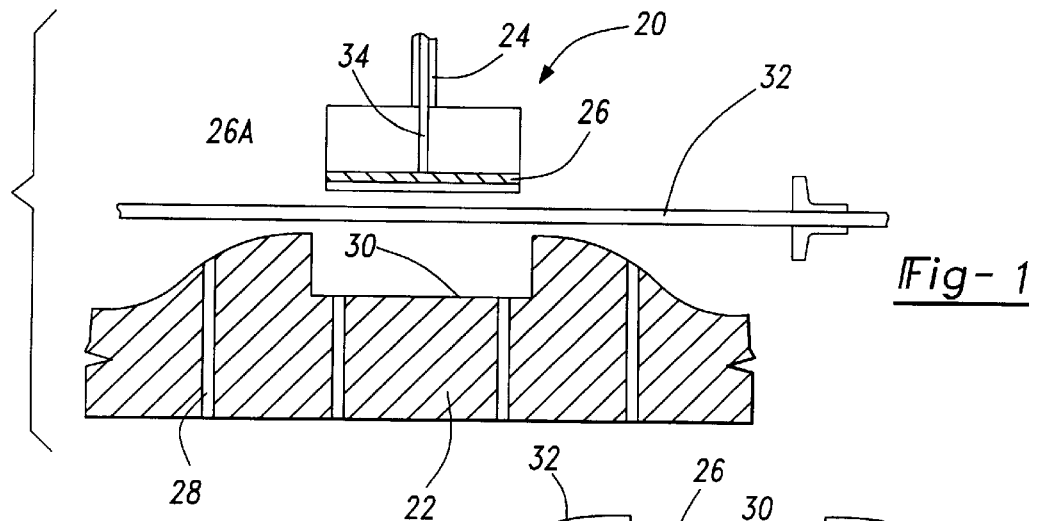
FIG. 1 shows the first step in the formation of a trim panel.

FIG. 1 shows assembly 20 for forming a trim panel preform. This type of preform is also known as cover stock or cover material. A male vacuum mold 22 is utilized in combination with a plug assist 24. Plug assist 24 carries an insert 26, which may be a decorative cloth insert. Other type inserts, such as leather, plastic, etc. also benefit from this method. Vacuum mold 22 includes a vacuum source as shown schematically by openings 28. A well 30 is also formed in mold 22. As is known, skin material 32, which is preferably vinyl, is heated in an oven, and is then brought above the mold 22. The skin is heated to a temperature on the order of 300° F. The plug 24 is then brought downwardly on the skin 32, with insert 26 brought against the skin 32. The plug 24 may include a source of air 34 such that it can blow the insert 26 onto the skin 32. The insert 26 may also be provided with a adhesive layer 26A. The adhesive may be one that is actuated by the heat of the skin 32 to secure the cloth 26 to skin 32. As shown in FIG. 1, the face of the skin 32 which receives insert 26 is the decorative or outer face. The face of insert 26 which is secured to skin 32 is the face which is covered in its final state. The decorative surface of the insert 26 faces the plug 24. Typically, the skin 32 is initially formed on mold 22 first. Then plug assist 24 brings the insert 26 into the well, to secure it to the skin.

Figure 2A:
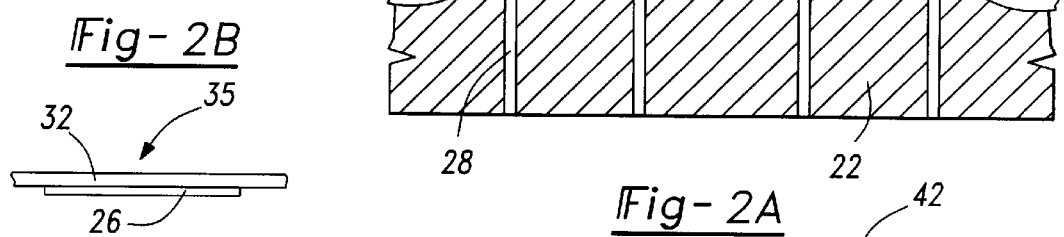
FIG. 2A shows a subsequent step in the formation of a trim panel.

As shown in FIG. 2A, the insert 26 has now been secured to the skin 32. The two materials are forced downwardly in the well 30 of the mold 22. Vacuum may assist in this formation.

Figure 2B:
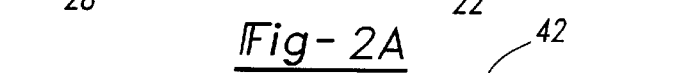
FIG. 2B shows a step subsequent to the FIG. 2A step.

As shown in FIG. 2B, preform 35 has now been formed from the combined skin 32 and cloth insert 26, which is now secured to the skin 32. The layer, while secured together, are still very flexible.

Figure 3A:
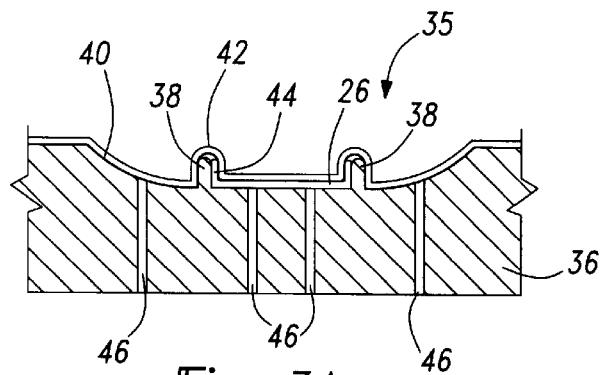
FIG. 3A shows another subsequent step.

As shown in FIG. 3A, a foam mold tool 36 includes tuck blade 38 which preferably surround the periphery of insert 26. The preform 35 is placed into mold 36. The preform 35 shapes itself to the mold shape such as shown in 40. The outer face, or class A surface, now faces downwardly against mold 36. Insert 26 contacts the mold, and skin 40 is behind the insert. However, at locations other than that of the insert, the skin 40 does contact the mold. As shown, portions 42 of the skin 40 bend around the tuck blades, and will form a well in the final trim part. The outer edges of insert 26 bend upwardly against the tuck blade 38 to form inner edges 44. As shown schematically, the mold 36 may be provided with vacuum openings 46 to assist in holding the skin 40 against the surface of the mold 36.

Figure 3B:
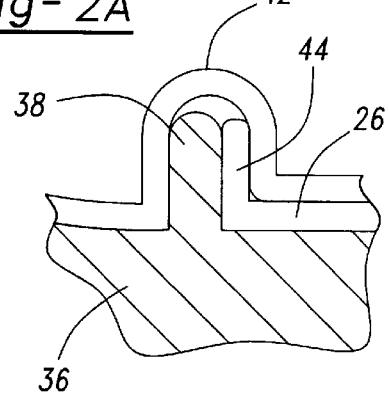
FIG. 3B is a detail of the FIG. 3A structure.

As shown FIG. 3B, the tuck blade 38 is preferably relatively thin. It forms the edges 44 of the insert 26 upwardly. The skin 40 and portion 42 also bend around the tuck blade 38.

Figure 4:
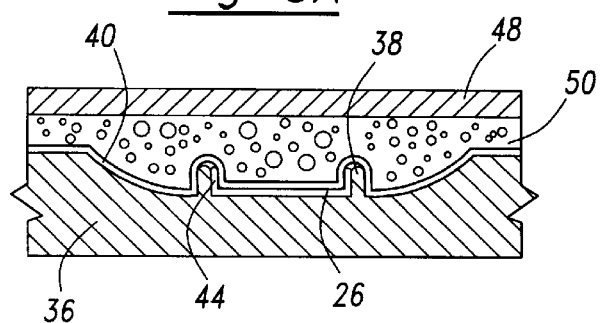
FIG. 4 shows another subsequent step.

As shown in FIG. 4, an outer mold portion or core half 48 is moved relative to mold 36 and foam 50 is injected between the two. Although the invention is typically used with foam, other polymers such as plastic may be used in some applications. The relative size of the foam is exaggerated, and the size of the final trim panel may actually be generally relatively thin in comparison.

Figure 5:
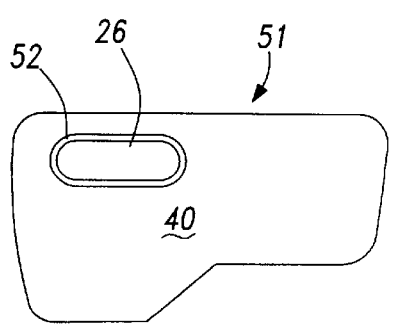
FIG. 5 shows the final trim product.

As shown in FIG. 5, the part 51 now includes the skin 40 having a shape from mold 36. Further processing may occur on part 51, although for purpose of this application, it will be considered a final part. Insert 26 is secured within the skin 40. A well 52 surrounds the insert 26 and is formed by the tuck blade 38.

With the present invention, since the preform 35 is inserted into the foam mold 36 already connected, one may easily ensure that the insert 26 is properly positioned within the mold 36. This improves the appearance and quality of the final part 51. In addition, since one can check the quality of the preform 35 before injecting the foam as shown in FIG. 4, one does not need to wait to the FIG. 4 step to identify scrap. If the insert 26 is improperly secured to the skin 32 at the preform stage, the preform itself can be discarded. This reduces the expense and waste that would occur if the error was not discovered until after the foam had been injected behind the skin. Also, there is no opportunity for the foam to penetrate the bond between the insert and the skin.

A preferred embodiment of this invention has been disclosed, however, a worker of ordinary skill in the art would recognize that certain modifications would come within the scope of this invention. For that reason, the following claims should be studied to determine the true scope and content of this invention.

We claim:

1. A method of forming a trim panel comprising the steps of:
    1) providing a vacuum mold having a well, and a plug being sized to fit within said well, said plug being movable towards and away from said vacuum mold;
    2) placing a skin material on said vacuum mold and over said well;
    3) then placing an insert between said plug and said skin material;
    4) then bringing said plug toward said skin material and into said well, said plug forcing said insert against said skin material;
    5) removing a preform of said skin and said insert from said vacuum mold, and placing said preform into a polymer mold, said polymer mold including a tuck blade bending edges of said insert inwardly of said tuck blades to form a well around said insert in a vinyl part; and
    6) injecting a polymer behind said skin and on an opposed side of said skin from said insert to form a trim panel.

2. A method as recited in claim 1, wherein said insert is formed with an adhesive on a surface which is brought in contact with said skin material, said skin material being raised to an elevated temperature such that said skin material heats and actuates said adhesive layer to secure said insert to said skin material.

3. A method as recited in claim 2, wherein said insert includes an outer cloth face which faces outwardly of an outer face of said skin in said trim panel.

4. A method as recited in claim 1, wherein said plug is provided with a source of air, said air assisting in separating said insert from said plug, once said insert has been secured to said plug.

5. A method as recited in claim 1, wherein said portions of said skin remain between said foam and said insert.

6. A method as recited in claim 1, wherein said polymer is a foam.

7. A method as recited in claim 1, wherein said insert is placed on said sheet and within said well prior to said plug being brought into contact with said insert.

8. A method of forming a trim panel comprising the steps of:
    (1) providing a vacuum mold have a well, and a plug sized to fit within said well, said plug being movable towards and away from said vacuum mold;
    (2) placing skin material on said vacuum mold and over said well;
    (3) then, placing an insert between said plug and said skin material, said insert being on an outer face of said skin material relative to a bottom of said well;
    (4) then bringing said plug toward said skin material and into said well, said plug forcing said insert against said skin material;
    (5) removing a preform of said skin and said insert from said vacuum mold and placing said preform into a polymer mold; and
    (6) injecting a polymer behind said skin and at an opposed side of said skin from said insert to form a trim panel.

9. A method as recited in claim 8, wherein an adhesive is deposited to bond said insert to said skin material.

10. A method as recited in claim 8, wherein said insert includes an outer cloth face which faces outwardly of an outer face of said skin in said trim panel.

11. A method as set forth in claim 8, wherein said insert is placed on said sheet and within said well prior to said plug being brought into contact with said insert.

* * * * *